US009604512B2

(12) United States Patent
Dueck et al.

(10) Patent No.: US 9,604,512 B2
(45) Date of Patent: Mar. 28, 2017

(54) DRAWBAR HITCH CONVERSION FOR PLANTERS WITH TWO-POINT HITCHES

(71) Applicant: Schnell Industries Inc., Plum Coulee (CA)

(72) Inventors: Fred Plett Dueck, Horndean (CA); Brenton Leray Dueck, Plum Coulee (CA)

(73) Assignee: SCHNELL INDUSTRIES INC., Winkler, Manitoba (CA)

( * ) Notice: Subject to any disclaimer, the term of this patent is extended or adjusted under 35 U.S.C. 154(b) by 330 days.

(21) Appl. No.: 14/503,546

(22) Filed: Oct. 1, 2014

(65) Prior Publication Data
US 2016/0096405 A1   Apr. 7, 2016

(51) Int. Cl.
| B60D 1/07 | (2006.01) |
| B60D 1/24 | (2006.01) |
| B60D 1/46 | (2006.01) |
| B60D 1/66 | (2006.01) |

(52) U.S. Cl.
CPC ............ B60D 1/075 (2013.01); B60D 1/246 (2013.01); B60D 1/46 (2013.01); B60D 1/66 (2013.01)

(58) Field of Classification Search
CPC .......... B60D 1/46; B60D 1/141; B60D 1/143; B60D 1/075; B60D 1/07; B60D 1/52
USPC ........ 280/416.1, 416.2, 474, 491.5; 172/245, 172/246, 247, 248, 249
See application file for complete search history.

(56) References Cited

U.S. PATENT DOCUMENTS

| 3,235,013 A | * | 2/1966 | Kirkpatrick, Jr. ...... | A01B 51/00 172/248 |
| 4,220,350 A | * | 9/1980 | Hatcher ............... | A01B 59/042 172/248 |
| 4,336,954 A | * | 6/1982 | Orvis ..................... | B60D 1/141 172/248 |
| 5,267,747 A | * | 12/1993 | Thorn .................. | A01B 59/043 172/450 |

(Continued)

OTHER PUBLICATIONS

AgTalk, "Viewing a Thread—Planter Hitch Conversion", <http://talk.newagtalk.com/forums/thread-view.asp?tid=447409&displayType=nested> (Jan. 20, 2014) (3 pages).

(Continued)

*Primary Examiner* — Anne Marie Boehler
(74) *Attorney, Agent, or Firm* — Kyle R. Satterthwaite; Ryan W. Dupuis; Ade & Company Inc.

(57) ABSTRACT

A planter with a two-point hitch is converted to a drawbar configuration through use of an existing through-bore in the planter's pull tongue that originally served as part of a swiveling connection between the tongue and the two-point hitch. A pinned connection to the frame of the conversion unit via this existing through-bore of the planter tongue is augmented with a clamping mechanism that secures the planter tongue in place between two spaced-apart side plates of the conversion unit to prevent relative rotation between the planter tongue and the conversion unit about the axis of the coupling pin. The side plates are shaped so as not to interfere with connection lugs on the pull tongue of the planter where diagonal braces are connected between the tongue and foldable of the planter. Installation requires no modification to the planter, and the conversion unit is entirely removable in a non-destructive manner.

15 Claims, 5 Drawing Sheets

(56) References Cited

U.S. PATENT DOCUMENTS

| | | | |
|---|---|---|---|
| 6,155,588 A | 12/2000 | Maxey | |
| 6,406,051 B1 | 6/2002 | Phillips | |
| 8,662,520 B1* | 3/2014 | Powers | B60D 1/04 |
| | | | 280/415.1 |
| 2004/0195802 A1 | 10/2004 | Allen et al. | |
| 2011/0115194 A1* | 5/2011 | Hellbusch | B60D 1/015 |
| | | | 280/417.1 |
| 2012/0032416 A1 | 2/2012 | Frantz | |
| 2015/0258865 A1 | 9/2015 | Marcy | |

OTHER PUBLICATIONS

John Deere, "Drawbar Hitch" <http://salesmanual.deere.com/sales/salesmanual/en_NA/seeding/2008/feature/frame/deereplanter/drawn/drawn_drawbar_hitch.html> (Oct. 25, 2009) (1 page).

* cited by examiner

DRAWBAR HITCH CONVERSION FOR PLANTERS WITH TWO-POINT HITCHES

FIELD OF THE INVENTION

The present invention relates generally to planters, and more particularly to conversion of a planter with a factory-installed two-point hitch to a drawbar hitch configuration.

BACKGROUND

Applicant has found a demand in field of agricultural machinery for conversion of planters with two-point hitches to a drawbar hitch configuration, for example to enable towing of the planter by a four wheel drive tractor that features a drawbar hitch that is incompatible with the two-point hitch of the planter. Modification of the planter hitch rather than the tractor hitch allows the operator to maintain the tractor's compatibility with other drawbar implements. However, prior art solutions for equipping a planter with a drawbar hitch have involved welding of a permanent drawbar hitch unit to the planter, thereby permanently modifying the planter. Accordingly, there remains a desire for an improved planter hitch conversion solution.

Applicant has developed a conversion unit and installation method that installs easily without welding or other permanent modification to the planter, and is readily removable in the event an owner wants to revert to a two-point hitch.

SUMMARY OF THE INVENTION

According to one aspect of the invention there is provided a drawbar hitch conversion unit for a planter that is arranged to have a two-point hitch unit coupled to a longitudinal pull tongue of the planter near a forward end thereof by a pivotal connection through an upright bore in the pull tongue, the drawbar hitch conversion unit comprising:

a frame comprising:
  a pair of side plates residing in upright planes horizontally separated one another in a lateral direction to leave a space between said side plates, the space being open at a rear end thereof for receipt of the forward end of the pull tongue into a position between the upright side plates; and
  at least one cross member attached to the upright side plates and spanning across the space defined therebetween;

a tongue extension pivotally coupled to the frame for pivoting of the tongue extension in an upright plane about a pivot axis passing laterally through the upright planes of the side plates, the tongue extension reaching forwardly from the side plates to a front end of the tongue extension that is arranged for coupling to a drawbar hitch of a tractor;

an opening spanning through the at least one cross member from a topside thereof to an opposing underside thereof to accommodate passage of a coupling pin through said opening in a manner also passing through the upright bore of the pull tongue of the planter when said upright bore of the pull tongue is aligned with said opening in the at least one cross member, thereby coupling the hitch conversion unit to the pull tongue of the planter;

an actuator connected between the frame and the tongue extension and operable to effecting raising and lowering of the front end of the tongue extension relative to the frame about the pivot axis; and a clamping mechanism on the frame that is operable to clamp the pull tongue securely between the side walls of the frame at a longitudinally spaced distance from the opening in the at least one cross-member when the frame is connected to the pull tongue by the coupling pin.

Preferably the actuator is a linear actuator having an upper end pivotally coupled to the frame and an opposing lower end pivotally coupled to the tongue extension, the side plates are L-shaped plates each having an upright leg to which the upper end of the linear actuator is coupled and a lower leg jutting rearwardly from a lower end of the upright leg, an empty space above of the lower leg and behind the upright leg is available to accommodate connection lugs on the pull tongue of the planter that are used to connect diagonal braces between the pull tongue and foldable wings of the planter, and the clamping mechanism is arranged to clamp the pull tongue between the lower legs of the side plates at an elevation below the connection lugs of the pull tongue.

Preferably the clamping mechanism comprises a threaded clamping member that passes through a respective one of the side plates via a matingly threaded bore and is operable to tighten against, and back off from, a respective side of the pull tongue under rotation of said threaded clamping member in opposing directions in the threaded bore.

Preferably the clamping mechanism comprises a second threaded clamping member that passes through a second one of the side plates via a matingly threaded second bore and is operable to tighten against, and back off from, a second side of the pull tongue under rotation of said second threaded clamping member in opposing directions in the threaded second bore.

Preferably the at least one cross member comprises two vertically spaced cross-members arranged for receipt of the forward end of the pull tongue between said two vertically spaced-cross members and passage of the coupling pin through the pull tongue and both of said two vertically spaced cross-members.

Preferably a lower one of said two vertically spaced cross-members is of longitudinally greater dimension than an upper one of said two vertically spaced cross-members and extends rearwardly out from under the upper one of said two vertically spaced cross-members to define an elongated seat on which pull tongue resides when coupled to the hitch conversion unit.

According to a second aspect of the invention, there are provided, in combination, a planter and a hitch conversion unit for same, the planter having a longitudinal pull tongue with an upright bore passing therethrough near a forward end of the pull tongue for optional use as part of a swiveling connection between the planter and a compatible two-point hitch unit, wherein the hitch conversion unit comprises:

a frame;

a tongue extension having one end pivotally coupled to the frame of the hitch conversion unit and another end that is arranged for coupling to a drawbar hitch of a tractor;

an opening in the frame of the hitch conversion unit that is arranged for alignment with the upright bore in the pull tongue of the planter to enable receipt of a coupling pin through said opening and said bore in order to couple the hitch conversion unit to the planter; and a clamping mechanism mounted to the frame of the hitch conversion unit and operable to clamp the pull tongue of the planter securely to the frame at a longitudinally spaced distance from the opening in the frame when the frame is connected to the pull tongue by the coupling pin.

Preferably the frame of the hitch conversion unit comprises a pair of side plates residing on opposite sides of the pull tongue of the planter, and each side plate is shaped to reside only below and behind connection lugs of the planter that project laterally from opposing sides of the pull tongue for connection with diagonal braces of the planter that extend between the pull tongue and foldable wings of the planter.

Preferably the conversion unit comprises a linear actuator having an upper end pivotally coupled to the frame and an opposing lower end pivotally coupled to the tongue extension to effect raising and lowering of the tongue extension under collapse and extension of the linear actuator, and each side plate is an L-shaped plate having an upright leg to which the upper end of the linear actuator is coupled and a lower leg jutting rearwardly from a lower end of the upright leg below the connection lugs of the pull tongue.

Preferably the opening in the frame, in which the coupling pin is receivable, passes through two vertically spaced cross-members of the frame, between which the forward end of the pull tongue is received or receivable to enable passage of the coupling pin through the pull tongue and both of said two vertically spaced cross-members.

According to a third aspect of the invention, there is provided a method of attaching a drawbar hitch to a planter that has a pre-existing upright bore in a longitudinal pull tongue of the planter to enable a swivelling connection between said pull tongue and a compatible two-point hitch, the method comprising using a coupling pin to couple a frame of a drawbar hitch conversion unit to the longitudinal pull tongue of the planter via the existing upright throughbore therein, and clamping the pull tongue of the planter securely to the drawbar hitch conversion unit at a distance from where the pull tongue and frame are coupled by said coupling pin.

Preferably the step of using the coupling pin comprises removably installing said coupling pin and the step of clamping of the pull tongue comprises releasably clamping said pull tongue, whereby removal of the coupling pin and release of a clamped condition between the pull tongue and the hitch conversion unit enables removal of the hitch conversion unit from the planter in a non-destructive manner.

Preferably installation of the hitch conversion unit is free of any attachment to the planter other than installation of said coupling pin and said clamping of the pull tongue to the frame of the hitch conversion unit.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
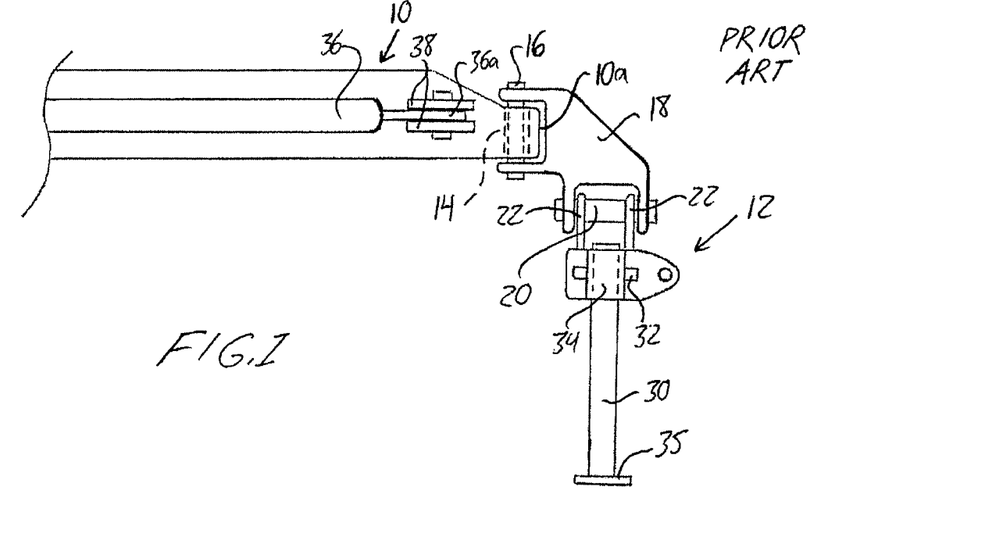
FIG. 1 is a side elevational view of a two-point hitch installation carried at the front end of a prior art planter.
Figure 2:
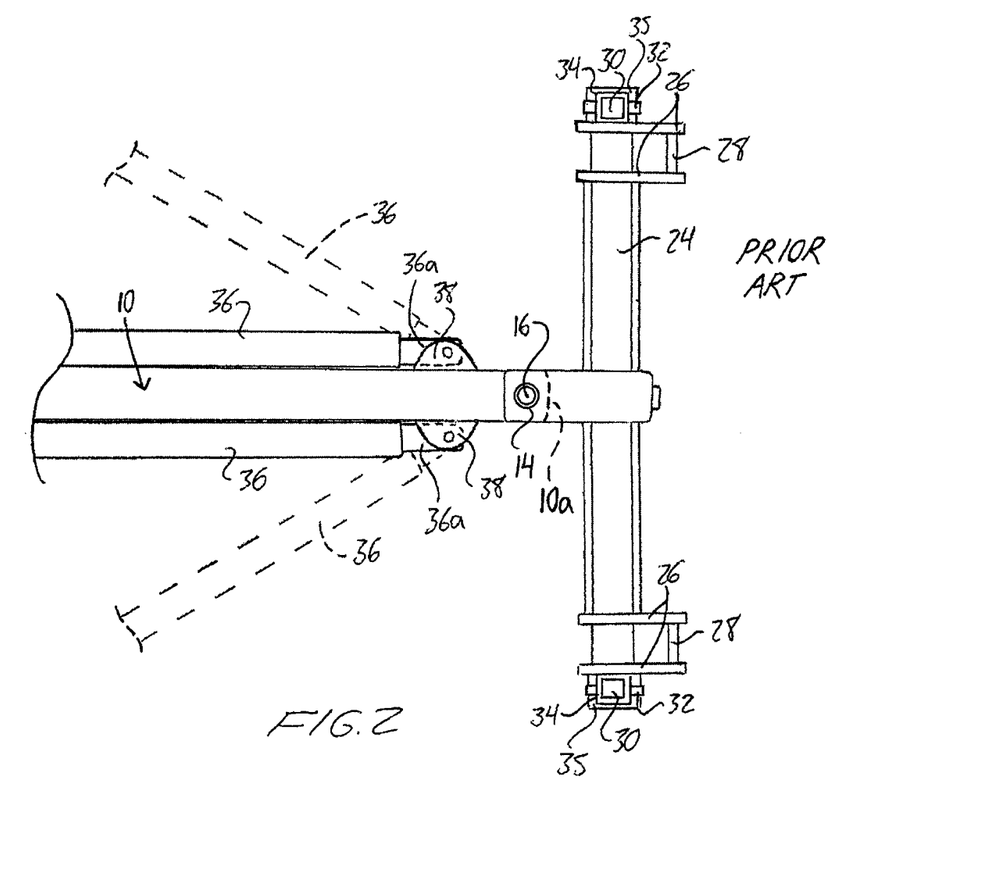
FIG. 2 is an overhead plan view of the prior art two-point hitch installation of FIG. 1.

FIGS. 1 and 2 illustrate a known type of two-point hitch installation on a planter. The planter features a central pull tongue 10 that extends generally horizontally in a longitudinal direction of the planter, and that carries the two-point hitch 12 at a front end 10*a* of the pull tongue 10. An opposing rear end of the pull tongue (not shown) is supported by a set of ground wheels and a pair of folding wings that are pivotally coupled to the pull tongue on opposing sides thereof. The wings carry seed dispensing units that deliver seed into the ground during a seeding operation. During such a seeding operation, the wings are unfolded into a deployed state extending laterally outward from the pull tongue on the respective sides thereof at perpendicular angles thereto. When seeding is complete, the tongue and attached wings are raised into a more elevated position drawing the seeding units upwardly out of engagement with the ground, and wings are folded up into positions lying parallel and adjacent to the pull tongue 10, thereby achieving a transport condition of the planter in which it spans notably a notably lesser footprint in the lateral direction. The raising and folding of the wings prepares the planter for roadway transport and storage. Folding planters of this type are well known, and so the description and drawings herein are limited to details of the planter that are pertinent to the hitch-mounting details of the present invention. Other details of the planter are omitted from the drawings for ease of illustration, and omitted from the description in the interest of brevity, as they are not essential to an understanding of the present invention.

Near the front end 10*a* of the pull tongue 10, an upright bore 14 passes perpendicularly through the pull tongue 10 from a topside thereof to an opposing underside thereof. The upright bore 14 is fitted with a bushing, inside of which is received an upright pivot pin 16 that passes fully through the upright bore 14 of the pull tongue 10. The pin 16 pivotally couples an elbow-shaped headpiece 18 to the pull tongue 10 in a manner allowing swivelling of the head piece 18 relative to the pull tongue 10 about the axis of the pivot pin 16. The elbow-shape of the head piece 18 turns ninety degrees downward from the front end 10*a* of the pull tongue 10, and at its lower end, carries a second pivot pin 20 that lies in perpendicular coplanar relationship with the first pivot pin 16.

The two-point hitch 12 is pivotally coupled to the headpiece 18 by the second pin 20 to enable pivoting of the two-point hitch 12 relative to the headpiece 18 about the axis of the second pivot pin 20, which lies parallel to the longitudinal dimension of the pull tongue 10 (i.e. lies horizontally when the tongue is likewise horizontally situated). The two point hitch 12 features a pair of upright flanges 22 standing upward from opposing sides of an elongated beam 24 of the two-point hitch 12 in order to form the pivotal connection of the beam 24 to the headpiece 18 at a central point of the beam's length, which lies perpendicularly to the axis of the second pivot pin 20. The beam 24 is thus pivotally suspended from the head piece 16 in a position lying cross-wise thereto a short height therebeneath. Near each end of the beam 24, a pair of parallel lug plates 26 project perpendicularly forwardly from the beam 24 in order to carry a short length of round bar 28 that perpendicularly spans between the lug plates 26 at a distance spaced forwardly from the beam 24. The two bars 28 form the connections points by which the two-point hitch is connectable to a compatible two-point hitch of a tractor or other tow vehicle.

A pair of leg stands 30 are provided at the opposing ends of the hitch beam 24, each being telescopically raisable and lowerable relative of the beam 24 and lockable at a number of different elevations by way of a locking pin or cross pin 32 engaged through the stand 30 and a square collar 32 through which the leg stand 30 slides. FIG. 1 shows the leg stands 30 in lowered positions placing feet 35 of the leg stands in contact with the ground in order to support the front end of the pull tongue in an elevated state generally equal to the wheel-supported rear end of the planter, thereby maintaining a horizontal orientation of the pull tongue during storage of the folded-up planter. When a two-point tractor hitch is connected to the planter's two-point hitch 12, the front end of the pull tongue is then supported by the tractor, and so the leg stands are raised out of contact with the ground, and locked in this elevated position.

The upright pivot pin 16 allows the two-point hitch 12 to swivel in a horizontal plane about the vertical axis of the pivot pin 16, and the second pivot pin 20 allows the two-point hitch 12 to swing laterally about the horizontal axis of the second pin 20. The two perpendicular pivot axes thus accommodate relative movement between the planter and the towing tractor during use. During seeding operations, in which the wings of the planter are unfolded, the unfolded positions of the wings are maintained by a pair of braces 36 that are respectively connected to the sides tongue 10 near the front end 10a thereof. For this purpose, each side of the tongue 16 features a pair of connection lugs 38 lying in parallel planes that extend in the longitudinal direction of the tongue. On each side of the tongue 10, the lugs 38 are spaced apart a short vertical distance to accommodate receipt of a front end 36a of the respective brace 36 between the lugs, where the brace is pinned to the tongue through the lugs 38. FIGS. 1 and 2 use solid lines to show the braces in stowed positions folded up alongside the tongue 10 in parallel relation thereto when the planter wings are in the folded-up transport/storage condition. When the wings are deployed for a seeding operation, the braces 36 extend diagonally of the tongue on the opposing sides thereof, as shown in broken lines in FIG. 2, in order to brace the deployed wings at outboard locations spaced laterally outward from the tongue.

Such swiveling connection of a two-point hitch 12 to a planter via a vertical/upright through-bore 14 in the front end of the pull tongue is employed in such planters as John Deere's 1770 and 1790 model planters. One known solution for converting such a planter to a drawbar hitch involves the removal of the upright pivot pin 16 in order to detach the headpiece 18, at which point a replacement drawbar hitch unit is permanently attached to the tongue 10 by welding. Such solutions thus necessitate the availability of suitable welding equipment and a skilled installer, and also prevent subsequent reversion of the planter back to a two-point configuration if such modification should later become desirable. As outlined below, Applicant has developed a unique solution by which a planter of the above-described type can be easily converted to a drawbar hitch configuration in a manner that requires no welding or other specialized skill or knowledge, involves no permanent modification to the planter itself, and can be easily reversed in order to return to the planter to its original two-point configuration.

Figure 3:
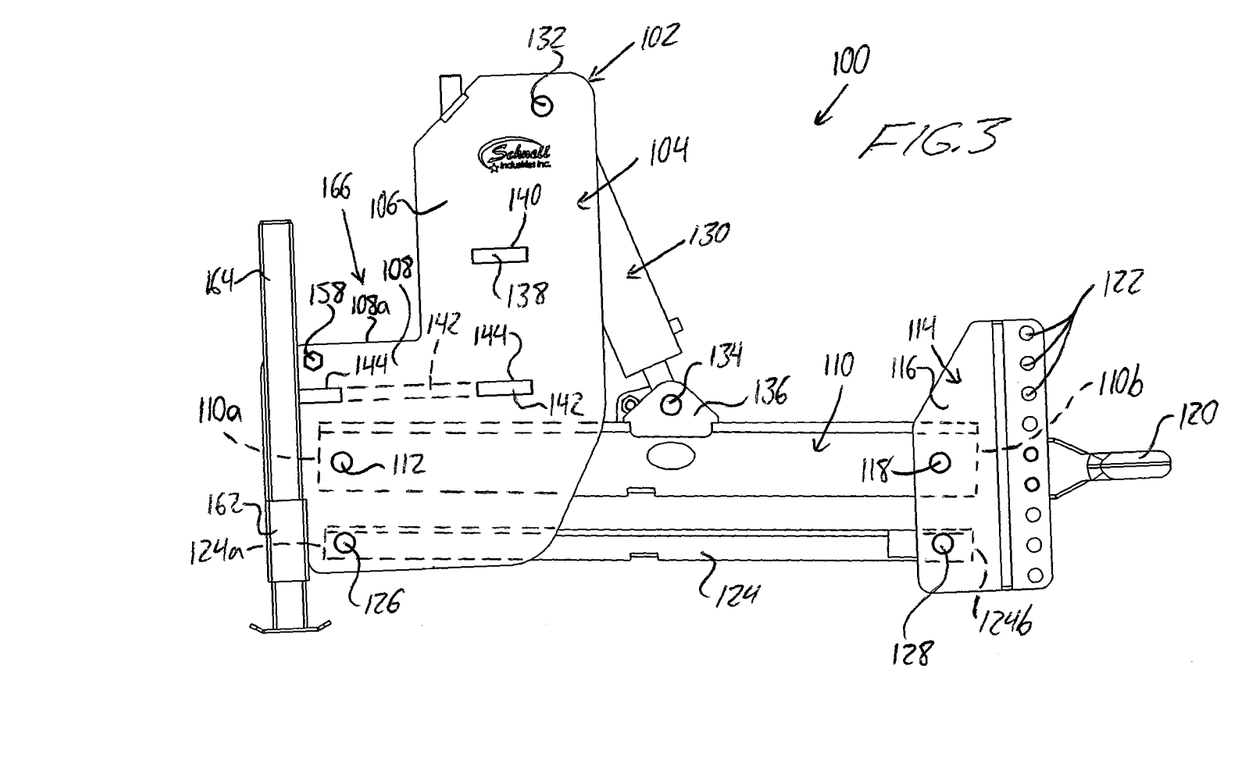
FIG. 3 is a side elevational view of a hitch conversion unit of the present invention for converting the planter of FIGS. 1 and 2 to a drawbar hitch configuration.
Figure 4:
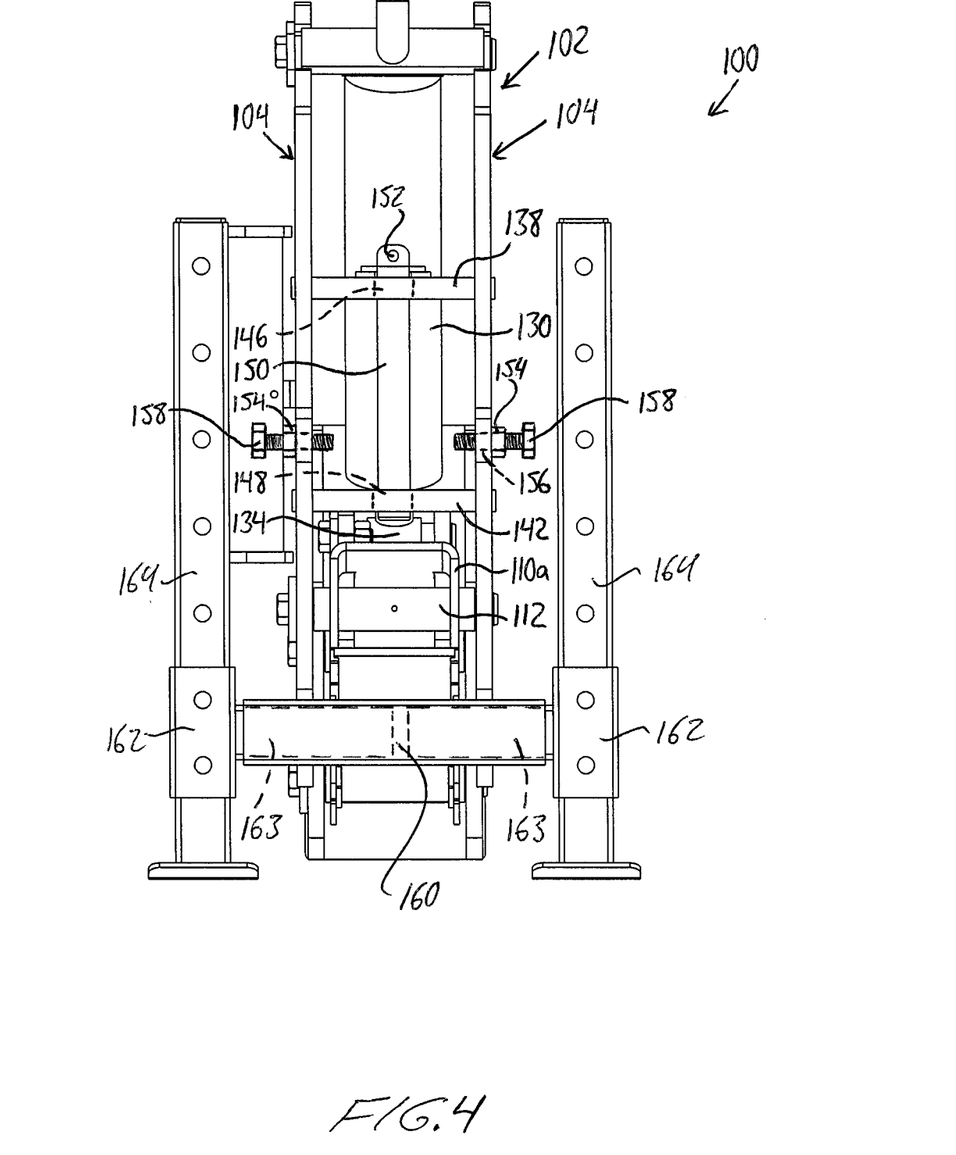
FIG. 4 is a rear elevational view of the hitch conversion unit of FIG. 3.
Figure 5:
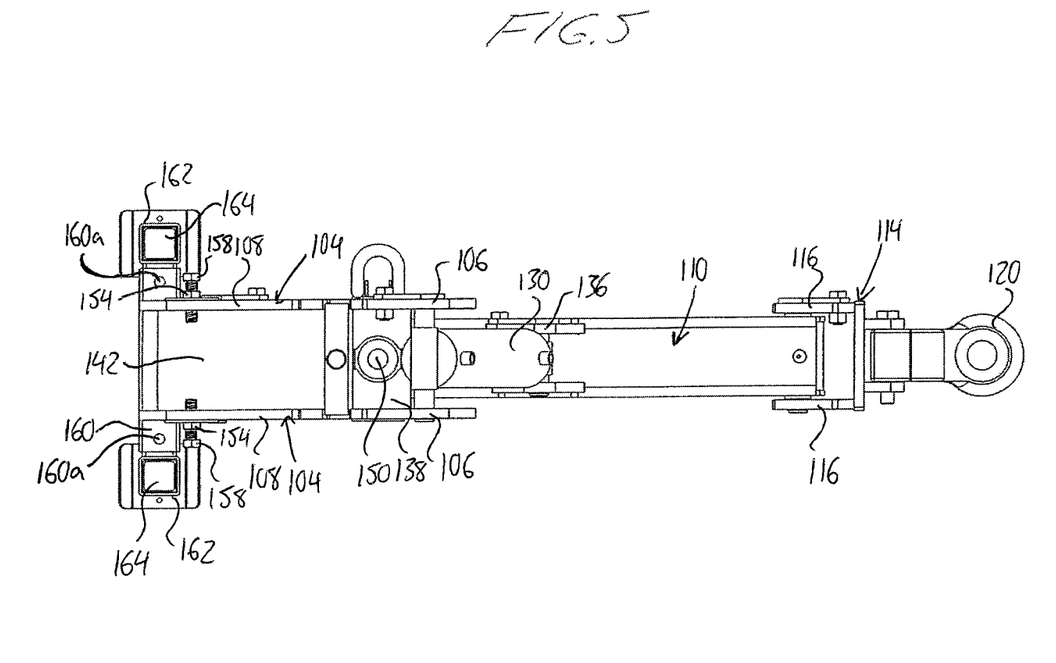
FIG. 5 is an overhead plan view of the hitch conversion unit of FIGS. 3 and 4.
Figure 6:
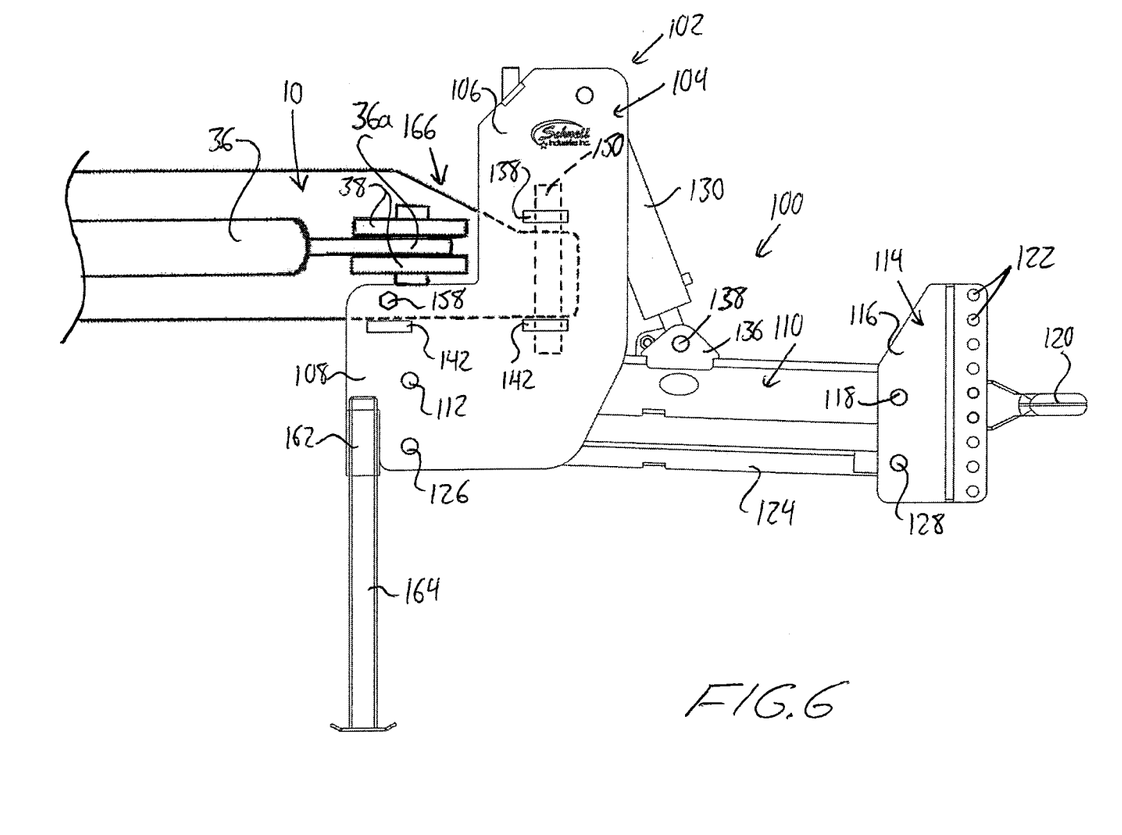
FIG. 6 is a side elevational view of the hitch conversion unit of FIGS. 3 to 5 installed on the planter of FIGS. 1 and 2 in place of the original two-point hitch thereof.

FIGS. 3 to 6 show a drawbar hitch conversion unit 100 of the present invention for converting the two-point planter of FIGS. 1 and 2 to a drawbar configuration towable by a pintle hook drawbar of a tractor or other tow vehicle. A frame 102 of the unit features two side plates 104 of matching shape that align with one another in parallel vertical planes that are horizontally spaced from one another in the lateral direction of the planter by a distance slightly exceeding the width of the planter's pull tongue 10 so that the front end 10a of the pull tongue 10 is receivable in the space between the two side plates 104, as described herein further below. Each side plate 104 is generally L-shaped, thus having a vertically upright leg 106 from which a horizontal lower leg 108 juts to one side from the lower end of the upright leg 6. The side views of FIGS. 3 and 6 are shown from a side of the unit in which the shape of the side plates 104 are seen as a "reversed L".

With reference to FIG. 3, a tongue extension beam 110 effectively acts as an extension of the planter's pull tongue when the unit 100 is installed on the planter. One end 110a of the tongue extension 110 is received in the space between the two laterally-spaced side plates 104, and is pivotally coupled to the side plates 104 by a first horizontal pivot pin 112 that perpendicularly spans between the two side plates 104 near a distal end of the lower leg 108 that lies furthest from the upright leg 106. This end 110a of the tongue extension 106 is referred to herein as the rear end 110a of the tongue extension 106, as its resides nearer to the rear end of the planter's pull tongue 10 than the opposing front end 110b of the tongue extension 110. The tongue extension 110 extends forwardly outward from the space between the side plates 104 so that the front end 110b of the tongue extension 110 resides outside this space at a distance beyond the upright legs 106 of the aligned side plates 104.

A bracket 114 is pivotally mounted to the tongue extension 110 near the front end 110b thereof by way of a second horizontal pivot pin 118 that passes perpendicularly through two side walls 116 of the bracket that lie on opposing sides of the tongue extension. A pintle ring 120 is carried on the tongue extension 110 by the bracket 114, which as shown, may feature a series of mounting sites 122 at which the pintle ring 120 can be bolted or otherwise fastened to the bracket 114, thereby allowing adjustment of the pintle ring's position relative to the bracket 114 in a direction lying cross-wise to the tongue extension 110. The pintle ring 120 reaches forwardly from the mounting bracket 114 to define a terminal forward end of the hitch conversion unit 100, where the unit is connectable to a pintle hook on the drawbar of a tractor or other tow vehicle. In the illustrated embodiment, a second beam 124 lies parallel to the tongue extension 110 and likewise has its rear end 124a pivotally coupled between the side plates 104 of the frame by a respective horizontal pivot pin 126, and its front end 124b pivotally coupled between the side walls 116 of the bracket 114 by another respective horizontal pivot pin 128. The tongue extension 110 and second beam 124 thus cooperate with the frame 102 and the bracket 114 in order to define a four-bar parallelogram linkage in which the tongue extension 110 and the second beam 124 move together in constant parallel relationship with one another. As a result, the bracket 114 and the attached pintle ring 120 are always maintained in the same orientation relative to the frame 102.

A hydraulic linear actuator 130 has an upper end thereof received in the space between the two side plates 104 of the frame 102, and pivotally coupled thereto by another horizontal pivot pin 132 that spans perpendicularly between the side plates 104. An opposing lower end of the linear actuator 130 is pivotally coupled to the tongue extension 110 by a horizontal pivot pin 134 that passes through a pair of lug plates 136 that stand upward from the topside of the tongue extension 110 in parallel vertical planes at opposing sides thereof. Connected to the tongue extension 110 at an intermediate point between the tongue extension's pivot pins 112, 118, the actuator 130 is operable to lower and raise the tongue extension 110 about its rear pivot pin 112 through extension and collapse of the actuator, respectively. The drawings show the actuator 130 in its fully collapsed state, corresponding to a fully raised state of the tongue extension 110. Extension of the actuator 130 from this state will thus drive the parallelogram linkage in a downward direction in order to lower the front end of the tongue extension (and the bracket 114 and pintle ring 120 mounted thereon) relative to the frame 102.

A first plate-shaped cross-member 138 horizontally spans between the upright legs 106 of two side plates 104 of the frame 102 at an elevation spaced above the top edges 108a of the lower legs 108, and spaced below the upper pivot pin 132 of the linear actuator 130. In the illustrated embodiment, the first cross-member 138 is cross-shaped or "+ shaped", where one of its two crossing portions has its ends respectively received in a pair of aligned rectangular slots 140 cut out of the two side plates 104. A second plate-shaped cross-member 142 horizontally spans between the lower legs 108 of the two side plates 104 of the frame 102 at a position spaced below the first cross-member 138 and above the tongue extension 110. In the illustrated embodiment, the lower cross-member 142 is I-shaped, where the central stem or web of the I-shape lies between the two side plates 104, and each crossed end or flange of the I-shape has its ends received in a pair of aligned rectangular slots 144 cut out of the two side plates 104. During manufacture of the hitch conversion unit, the slots are used to positively align the side plates 104 and cross-members in the appropriate positions relative to one another, at which point they are welded together where the cross-members 138, 142 reach through the slots 140, 144.

As best shown in FIG. 4, a vertical through-bore 146 passes through the upper cross-member 138 and aligns with a matching vertical through-bore 148 in the lower cross-member 142, whereby these aligned bores 146, 148 define an opening or passage extending from the topside of the upper cross-member 138 to the underside of the lower cross-member 142. This way, a coupling pin 150 is receivable in the aligned vertical bores 146, 148 in a position spanning through both the upper and lower cross-members 138, 142. A locking pin 152 passes perpendicularly through a top end of the coupling pin 150 at a location above the upper cross-member 138, thereby preventing the upper end of the coupling pin from falling through the vertical bore 146 of the upper cross-member. Alternatively, the coupling pin 150 may feature an enlarged head for such fall-prevention purposes keeping the pin in its installed position.

With continued reference to FIG. 4, at a short height above the lower cross-member 142 and below the top edge 108a of the side plate's lower leg 108, each side plate 104 has a nut 154 welded to its outer face, i.e. the side thereof that faces away from the other side plate 104. The nut 154 is aligned over a respective through-hole 156 in the side plate 104, and a matingly threaded clamping bolt 158 is threaded into the nut 154 so as to jut into the interior space of the frame between the two side plates 104 via the through-hole 156 in the side plate. The nut 154 thus defines a threaded bore on the side plate 104 by which the clamping bolt 158 can be advanced into, and backed out of, the space between the two side plates 104. The nuts 154 and through-holes 156 of the two side plates 104 are positioned in alignment with one another, whereby the two clamping bolts 158 align with one another across the space between the side plates 104 of the frame 102.

As shown in FIG. 4, at the distal ends of the lower legs 108 of the two side plates 104 of the frame 102, a cross bar 160 is attached to the side plates 104 in a position spanning perpendicularly across the same at the rear end of the frame 102. The cross bar may be recessed or notched into the side plates at the rear edges thereof so as to limit or avoid any jutting of the cross-member rearwardly from the frame 102. This recessed positioning of the cross-member into the frame 102 can be seen in the overhead view of FIG. 5. The cross-bar 160 reaches outwardly beyond each of the side plates 104 so as to extend laterally outward from the rest of the frame 102. At each of its outboard ends, the cross-bar 160 carries a respective collar 162 in the form of a short length of upright rectangular or square tubing in which a respective leg stand 164 is telescopically received. The two leg stands 164 operate in the same manner as those of the original two-point hitch 12 of the planter so that when the hitch conversion unit 100 is installed on the pull tongue of the planter, the legs 164 can be lowered downwardly to the ground from the hitch conversion unit in order to support the front end of the pull tongue 10, and the hitch conversion unit installed thereon, at a height above the ground until the hitch conversion unit is connected to a drawbar of the tractor or other tow vehicle.

Each collar 162 may be the cross-piece of a T-shaped unit, whose stem 163 extends into a hollow interior of the cross-bar 160, whereby the T-shaped unit is telescopically mated with a respective end of the cross-bar 160 in order to allow adjustment of the outboard position of the respective leg stand 164. FIG. 5 shows a vertical bore 160a passing through the cross-bar 160 near each end thereof at a position situated outside the respective side plate 104 of the frame. A series of vertical bores through the stem 163 of each T-shaped collar unit allows a locking pin to be passed through the cross-bar bore 160a and a selected bore of the stem 163 of the T-shaped collar unit in order to lock the desired lateral position of the respective leg stand 164 relative to the side plate 104 of the frame 102.

Having described the structure of the hitch conversion unit 100, attention is now turned to the installation of same on a planter that is designed for, or compatible with, the swivelled two-point hitch installation described above and shown in FIGS. 1 and 2. First, with the pull tongue 10 temporarily supported by means other than the two-point hitch and attached leg stands 30, the upright pivot pin 16 is removed from the head piece 18 and the pull tongue 10, and the headpiece 18 and attached two-point hitch 12 are removed from the pull tongue 10. Turning now to FIG. 6, with each clamping bolt 158 backed out from the space between the two side plates 104 of the conversion unit's frame 102, the conversion unit 100 is slid longitudinally into place on the front end 10a of the pull tongue of the planter by sliding the lower cross-member 142 of the conversion unit 100 along the underside of the pull tongue 10 of the planter until the vertical through-bores 146, 148 of the conversion unit's cross-members 138, 142 align with the vertical through-bore 14 in the planter's pull tongue 10. Having achieved this alignment, the coupling pin 150 is passed downwardly through the aligned vertical bores 146, 148, 14 of the conversion unit 100 and planter tongue 10 until the locking or cross pin 152 of the coupling pin 150, or head thereof, is seated atop the upper cross-member 138, thereby marking that the bottom end of the coupling pin 150 has passed fully through the pull tongue 10 of the planter and the lower cross-member 142 of the conversion unit 100. The vertical through-bores in the cross-members 138, 142 may be fitted with bushings, through which the coupling pin 150 is inserted to prevent wear between the conversion unit and coupling pin. At this point, the pull tongue is seated atop the lower cross-member 142 of the conversion unit's frame 102, and the coupling pin 150 couples the hitch conversion unit 100 to the planter using the original pivot-pin bore 14 that was originally used or intended for mounting the swivelling headpiece 18 of the original two-point hitch installation. Whereas the upper cross-member 138 stops short of the rear edge of the upright leg 106 of the side plate 104, the lower cross-member 142 is longer than the upper cross-member so as to extend rearwardly outward therefrom past the rear edge of the upright leg 106 of the side plate 104 so as to reach further along the lower leg of the side plate in order to define an elongated seat for the pull tongue.

To prevent any pivoting of the conversion unit's frame 102 relative to the pull tongue about the upright axis of the coupling pin 150 due to clearance between the side plates 104 of the unit 100 and the sides of the pull tongue 10, each of the clamping bolts 158 is advanced into the interior space of the conversion's units frame 102 through the respective side plate 104 in order to drive the free end of each clamping bolt 158 into abutment against the respective side of the pull tongue 10, thereby securely clamping the pull tongue 10 between the two clamping bolts 158. As shown in FIG. 6, the L-shaped configuration of each side plate 104 and shorter length of the upper cross-member (relative to the lower cross-member) means that the cut-out space 166 situated above the lower leg 108 and behind the upright leg 106 of the side plate 104 is left entirely unoccupied by the side plate 104 or any other part of the conversion unit. This area is thus left entirely open in order to accommodate receipt of the connection lugs 38 that project laterally outward from the pull tongue 10 of the planter, regardless of minor variations that may exist in the placement of these lugs from one planter to the next. The clamping bolt 158 on each side of the frame 102 engages with the side of the trailer tongue at an available area thereof residing below the connection lugs 38, and at a notable longitudinal distance from the vertical bores 14, 146, 148 through which the coupling pin 150 passes.

By using the existing through-bore of the trailer tongue as a coupling point for releasably connecting the conversion unit to the planter, the need for welding or other modification to the planter is avoided, while the additional clamping mechanism defined by the two clamping bolts 158 avoids any undesirable play about the axis of the pinned connection between the planter and the hitch conversion unit. The conversion unit allows for relative movement between the planter and tractor about two perpendicular axes by way of the pintle connection, instead of through the two different pinned connections 16, 20 in the original two-point hitch installation of FIGS. 1 and 2. The hitch conversion unit is easily removed by reversal of the installation process, i.e. by loosening of the clamping bolts 158, withdrawal of the coupling pin, and sliding of the conversion unit off the front end 10a of the pull tongue 10 of the planter. At such time, a two-point hitch of the compatible type illustrated in FIGS. 1 and 2 can be easily installed by using the pivot pin 16 to pivotally couple the headpiece 18 to the front end of the pull tongue.

It will be appreciated that the use of the terms "vertical" and "horizontal" in the forgoing description are being used in particular reference to the illustrated positions and orientations of the planter pull tongue and conversion unit, as would be seen in the instance of the planter tongue having its forward and rear ends supported at equal elevation above a purely planar, truly horizontal surface, where the longitudinal dimension of the tongue lies truly horizontal with its opposing sides in truly vertical planes. Accordingly, these terms are not intended to denote particular orientations in which the features concerned must reside during use of the invention. The term upright is therefore used to denote an orientation that is more vertical than horizontal, rather than to specifically denote a purely vertical orientation.

Since various modifications can be made in my invention as herein above described, and many apparently widely different embodiments of same made within the spirit and scope of the claims without departure from such spirit and scope, it is intended that all matter contained in the accompanying specification shall be interpreted as illustrative only and not in a limiting sense.

The invention claimed is:

1. A drawbar hitch conversion unit for a planter that is arranged to have a two-point hitch unit coupled to a longitudinal pull tongue of the planter near a forward end thereof by a pivotal connection through an upright bore in the pull tongue, the drawbar hitch conversion unit comprising:
   a frame comprising:
      a pair of side plates residing in upright planes horizontally separated from one another in a lateral direction to leave a space between said side plates, the space being open at a rear end thereof for receipt of the forward end of the pull tongue into a position between the upright side plates; and
      at least one cross member attached to the upright side plates and spanning across the space defined therebetween;
   a tongue extension pivotally coupled to the frame for pivoting of the tongue extension in an upright plane about a pivot axis passing laterally through the upright planes of the side plates, the tongue extension reaching forwardly from the side plates to a front end of the tongue extension that is arranged for coupling to a drawbar hitch of a tractor;
   an opening spanning through the at least one cross member from a topside thereof to an opposing underside thereof to accommodate passage of a coupling pin through said opening in a manner also passing through the upright bore of the pull tongue of the planter when said upright bore of the pull tongue is aligned with said opening in the at least one cross member, thereby coupling the hitch conversion unit to the pull tongue of the planter;
   an actuator connected between the frame and the tongue extension and operable to effect raising and lowering of the front end of the tongue extension relative to the frame about the pivot axis; and
   a clamping mechanism on the frame that is operable to clamp the pull tongue securely between the side walls of the frame at a longitudinally spaced distance from the opening in the at least one cross-member when the frame is connected to the pull tongue by the coupling pin.

2. The hitch conversion unit of claim 1 wherein the actuator is a linear actuator having an upper end pivotally coupled to the frame and an opposing lower end pivotally coupled to the tongue extension, the side plates are L-shaped plates each having an upright leg to which the upper end of the linear actuator is coupled and a lower leg jutting rearwardly from a lower end of the upright leg, an empty space above the lower leg and behind the upright leg is available to accommodate connection lugs on the pull tongue of the planter that are used to connect diagonal braces between the pull tongue and foldable wings of the planter, and the clamping mechanism is arranged to clamp the pull tongue between the lower legs of the side plates at an elevation below the connection lugs of the pull tongue.

3. The hitch conversion unit of claim 1 wherein the clamping mechanism comprises a threaded clamping member that passes through a respective one of the side plates via a matingly threaded bore and is operable to tighten against, and back off from, a respective side of the pull tongue under rotation of said threaded clamping member in opposing directions in the threaded bore.

4. The hitch conversion unit of claim 3 wherein the clamping mechanism comprises a second threaded clamping member that passes through a second one of the side plates via a matingly threaded second bore and is operable to tighten against, and back off from, a second side of the pull tongue under rotation of said second threaded clamping member in opposing directions in the threaded second bore.

5. The hitch conversion unit of claim 1 wherein the at least one cross member comprises two vertically spaced cross-members arranged for receipt of the forward end of the pull tongue between said two vertically spaced-cross members and passage of the coupling pin through the pull tongue and both of said two vertically spaced cross-members.

6. The hitch conversion unit of claim 5 wherein a lower one of said two vertically spaced cross-members is of longitudinally greater dimension than an upper one of said two vertically spaced cross-members and extends rearwardly out from under the upper one of said two vertically spaced cross-members to define an elongated seat on which the pull tongue resides when coupled to the hitch conversion unit.

7. The hitch conversion unit of claim 1 wherein the side plates are L-shaped plates each having an upright leg and a lower leg jutting rearwardly from a lower end of the upright leg and leaving an empty space above of the lower leg and behind the upright leg available to accommodate connection lugs on the pull tongue of the planter that are used to connect diagonal braces between the pull tongue and foldable wings of the planter.

8. In combination, a planter and a hitch conversion unit therefore, the planter having a longitudinal pull tongue with an upright bore passing therethrough near a forward end of the pull tongue for optional use as part of a swiveling connection between the planter and a compatible two-point hitch unit, wherein the hitch conversion unit comprises:
 a frame;
 a tongue extension having one end pivotally coupled to the frame of the hitch conversion unit and another end that is arranged for coupling to a drawbar hitch of a tractor;
 an opening in the frame of the hitch conversion unit that is arranged for alignment with the upright bore in the pull tongue of the planter to enable receipt of a coupling pin through said opening and said bore in order to couple the hitch conversion unit to the planter; and
 a clamping mechanism mounted to the frame of the hitch conversion unit and operable to clamp the pull tongue of the planter securely to the frame at a longitudinally spaced distance from the opening in the frame when the frame is connected to the pull tongue by the coupling pin;
 wherein the frame of the hitch conversion unit comprises a pair of side plates residing on opposite sides of the pull tongue of the planter, and each side plate is shaped to reside only below and behind connection lugs of the planter that project laterally from opposing sides of the pull tongue for connection with diagonal braces of the planter that extend between the pull tongue and foldable wings of the planter.

9. The combination of claim 8 wherein hitch the conversion unit comprises a linear actuator having an upper end pivotally coupled to the frame and an opposing lower end pivotally coupled to the tongue extension to effect raising and lowering of the tongue extension under collapse and extension of the linear actuator, and each side plate is an L-shaped plate having an upright leg to which the upper end of the linear actuator is coupled and a lower leg jutting rearwardly from a lower end of the upright leg below the connection lugs of the pull tongue.

10. The combination of claim 8 wherein the clamping mechanism comprises a threaded clamping member that passes through a respective one of the side plates via a respective matingly threaded bore and is operable to tighten against, and back off from, a respective side of the pull tongue under rotation of said threaded clamping member in opposing directions in the threaded bore.

11. The combination of claim 10 wherein the clamping mechanism comprises a second threaded clamping member that passes through a second one of the side plates via a matingly threaded second bore and is operable to tighten against, and back off from, a second side of the pull tongue under rotation of said second threaded clamping member in opposing directions in the threaded second bore.

12. The combination of claim 8 wherein the clamping mechanism comprises a threaded clamping member that passes through a respective one of the side plates via a respective matingly threaded bore and is operable to tighten against, and back off from, a respective side of the pull tongue under rotation of said threaded clamping member in opposing directions in the threaded bore.

13. The combination according to claim 8 wherein the side plates are L-shaped plates each having an upright leg and a lower leg jutting rearwardly from a lower end of the upright leg, and the connection lugs of the planter reside in an empty space above of the lower leg and behind the upright leg.

14. In combination, a planter and a hitch conversion unit therefore, the planter having a longitudinal pull tongue with an upright bore passing therethrough near a forward end of the pull tongue for optional use as part of a swiveling connection between the planter and a compatible two-point hitch unit, wherein the hitch conversion unit comprises:
 a frame;
 a tongue extension having one end pivotally coupled to the frame of the hitch conversion unit and another end that is arranged for coupling to a drawbar hitch of a tractor;
 an opening in the frame the hitch conversion unit that is arranged for alignment with the upright bore in the pull tongue of the planter to enable receipt of a coupling pin through said opening and said bore in order to couple the hitch conversion unit to the planter; and
 a clamping mechanism mounted to the frame of the hitch conversion unit and operable to clamp the pull tongue of the planter securely to the frame at a longitudinally spaced distance from the opening in the frame when the frame is connected to the pull tongue by the coupling pin;
 wherein the opening in the frame, in which the coupling pin is receivable, passes through two vertically spaced cross-members of the frame, between which the forward end of the pull tongue is received or receivable to enable passage of the coupling pin through the pull tongue and both of said two vertically spaced cross-members.

15. The combination of claim 14 wherein a lower one of said two vertically spaced cross-members is of longitudinally greater dimension than an upper one of said two vertically spaced cross-members and extends rearwardly out from under the upper one of said two vertically spaced cross-members to define an elongated seat on which pull tongue resides when coupled to the hitch conversion unit.

* * * * *